United States Patent
Coretto et al.

(10) Patent No.: US 11,927,272 B1
(45) Date of Patent: Mar. 12, 2024

(54) VALVES WITH MULTI-PIECE SLEEVES

(71) Applicant: Hamilton Sundstrand Corporation, Charlotte, NC (US)

(72) Inventors: August M. Coretto, Manchester, CT (US); Glenn Gradischer, Canton, CT (US); Francis P. Marocchini, Somers, CT (US); Peter M. Ballard, Enfield, CT (US); Scott J. Beloncik, Westfield, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/080,320

(22) Filed: Dec. 13, 2022

(51) Int. Cl.
*F16K 27/04* (2006.01)
*F16K 11/07* (2006.01)

(52) U.S. Cl.
CPC ........ *F16K 11/0712* (2013.01); *F16K 27/041* (2013.01)

(58) Field of Classification Search
CPC ...... F16K 11/0712; F16K 27/041; F16K 3/24; F16K 3/243
See application file for complete search history.

(56) References Cited

U.S. PATENT DOCUMENTS

| | | | |
|---|---|---|---|
| 2,938,704 A * | 5/1960 | Quail | F16K 41/04 251/363 |
| 3,565,115 A * | 2/1971 | Beckett | F15B 13/04 137/625.69 |
| 3,951,381 A * | 4/1976 | Whitener | F16K 11/0712 251/356 |
| 4,070,005 A * | 1/1978 | McJones | F16K 3/243 251/210 |
| 4,646,785 A | 3/1987 | Ruedle et al. | |
| 4,664,151 A | 5/1987 | Piet | |
| 2014/0053927 A1* | 2/2014 | Podgorski | F02C 6/08 137/596 |
| 2017/0075364 A1* | 3/2017 | Patterson | F16K 11/0712 |
| 2018/0209547 A1* | 7/2018 | Coretto | F02C 7/232 |
| 2022/0298933 A1 | 9/2022 | Burke | |

\* cited by examiner

*Primary Examiner* — Kelsey E Cary
(74) *Attorney, Agent, or Firm* — Locke Lord LLP; Joshua L. Jones; Scott D. Wofsy

(57) ABSTRACT

A valve assembly includes a first sleeve defining a piston bore therein. A second sleeve defines a piston bore therein. The piston bore of the first sleeve and the piston bore of the second sleeve are axially aligned. A piston is slidingly engaged in the piston bores of the first and second sleeves. A seal carrier with a plurality of pieces is axially between the first sleeve and the second sleeve. The plurality of pieces of the multi-piece seal carrier are circumferentially spaced apart from one another.

20 Claims, 4 Drawing Sheets

VALVES WITH MULTI-PIECE SLEEVES

BACKGROUND

1. Field

The present disclosure relates to valves, and more particularly to spool and sleeve valves.

2. Description of Related Art

Spool and sleeve valves are used for most hydraulic valve applications. The architecture required by these valves have become increasingly complicated. In some cases, schematic requirements are driving a need for multi-piece sleeve designs with multi-piece spools. Spools typically are the smaller component and neck down to small diameters, which can be a challenge for structural sizing. The tensile strength of a small axial connection between multi-piece spool parts can end up limiting the pressure differential a given valve can handle before breaking the axial connection.

The conventional techniques have been considered satisfactory for their intended purpose. However, there is an ever present need for improved systems and methods for spool valves. This disclosure provides a solution for this need.

SUMMARY

A valve assembly includes a first sleeve defining a piston bore therein. A second sleeve defines a piston bore therein. The piston bore of the first sleeve and the piston bore of the second sleeve are axially aligned. A piston is slidingly engaged in the piston bores of the first and second sleeves. A seal carrier with a plurality of pieces is axially between the first sleeve and the second sleeve. The plurality of pieces of the multi-piece seal carrier are circumferentially spaced apart from one another.

The seal carrier can extend circumferentially around the piston. The seal carrier can include axially extending tabs that seat inside a radially inward surface of at least one of the first sleeve and the second sleeve. The piston bore of the first sleeve can have a diameter equal to that of the piston bore of the second sleeve.

The piston can be spool shaped, with a first piston end engaged with the first sleeve, a second piston end engaged with the second sleeve, and a spool section connecting between the first and second piston ends. The spool section can have a smaller diameter that both of the first and second piston ends. The first piston end, the spool section, and the second piston end can all be a single, monolithic piece.

The first sleeve can include a first port radially extending therethrough for fluid communication of a control fluid to act on an outer face of the first piston end. The second sleeve can include a second port radially extending therethrough for fluid communication of a control fluid to act on an outer face of the second piston end.

A face seal can be seated in the seal carrier, sealing between seal carrier and second sleeve. Each piece of the seal carrier can include a groove with a matching diameter, wherein the face seal is seated in the groove of each piece. The first sleeve can include a third port radially extending therethrough for fluid communication of a control fluid into a volume with the spool section between the first and second piston ends. The second sleeve can include a fourth port radially extending therethrough for fluid communication of a control fluid therethrough. In a first position of the piston, the second piston end can seal against the face seal preventing flow from the third port to the fourth port. In a second position of the piston, the second piston end can be spaced apart from the face seal to allow fluid communication between the third port and the fourth port. In the first position of the piston, the face seal can seal around a full circumference of the second piston end and of the second sleeve.

A housing can be included that houses the first and second sleeves therein. A radial seal around the second sleeve can be included to seal against the second sleeve and against the housing to stop flow between circumferential gaps between pieces of the seal carrier. There can be two pieces of the seal carrier, wherein two circumferential gaps space apart the two pieces from one another.

A snap ring can be engaged about the two pieces to hold the two pieces of the seal carrier together. An o-ring can be engaged about the two pieces to hold the two pieces of the seal carrier together. Each piece can include a locating pin seated in a pin bore of the other piece. The two pieces can be bolted together across the gaps.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
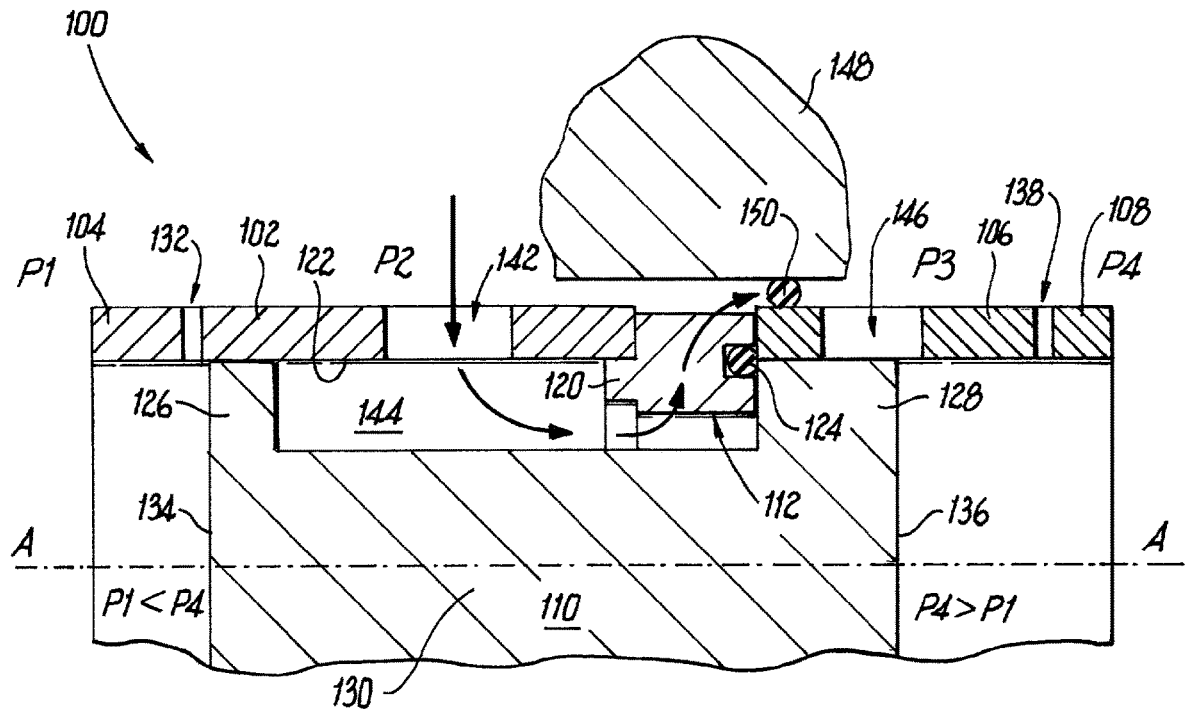
FIG. 1 is a schematic cross-sectional side view of an embodiment of a valve assembly constructed in accordance with the present disclosure, showing the piston, sleeves, and multi-piece seal carrier.

Reference will now be made to the drawings wherein like reference numerals identify similar structural features or aspects of the subject disclosure. For purposes of explanation and illustration, and not limitation, a partial view of an embodiment of a valve assembly in accordance with the disclosure is shown in FIG. 1 and is designated generally by reference character 100. Other embodiments of systems in accordance with the disclosure, or aspects thereof, are provided in FIGS. 2-9, as will be described. The systems and methods described herein can be used to provide for multi-piece seal carriers in valve assemblies, which allow for one-piece piston spools construction.

The valve assembly 100 includes a first sleeve 102 defining a piston bore 104 therein. A second sleeve 106 defines a piston bore 108 therein. The piston bore 104 of the first sleeve 102 and the piston bore 108 of the second sleeve 106 are axially aligned along axis A. A piston 110 is slidingly engaged in the piston bores 104, 108. A multi-piece seal carrier 112 is engaged axially between the first sleeve 102 and the second sleeve 106. The plurality of pieces 114, 116 (labeled in FIG. 3) of the seal carrier 112 are circumferentially spaced apart from one another with circumferential gaps 118 spacing the pieces 114, 116 apart from one another. Those skilled in the art will readily appreciate that any suitable number of pieces and gaps can be used instead of two without departing from the scope of this disclosure.

The seal carrier 112 extends circumferentially around the piston 110. The seal carrier 112 includes axially extending tabs 120 that seat inside a radially inward surface 122 of at least one of the first sleeve 102 and the second sleeve 106 to prevent radial expansion of the seal carrier 112 which could put face seal 124 in tension. The piston bore 104 of the first sleeve 102 has a diameter equal to that of the piston bore 108 of the second sleeve 106.

However, those skilled in the art will readily appreciate that these two diameters do not necessarily need to be equal for systems and methods disclosed herein to operate. The systems and methods herein can be applicable to any scenario where it is desirable to add a face seal into a intermediate pressure in a valve assembly (driven by tight or zero leakage requirements), and when the diameters are similar. One diameter needs to grow by about 0.200 inches (0.508 cm) before it is no longer necessary to use a multi-piece seal carrier and there can just be two sleeves. A common face seal geometry is dictated by SAE ARP1234, so the requirement on diameter alignment can be that the two diameters are such that one cannot fit a face seal per industry standard in the end of the smaller sleeve without interrupting the diameters (of bores 104 or 108).

The piston 110 is spool shaped, with a first piston 126 end engaged with the first sleeve 102, a second piston end 128 engaged with the second sleeve 106. A spool section 130 of the piston connects between the first and second piston ends 126, 128. The spool section 130 has a smaller diameter that both of the first and second piston ends 126, 128. The first piston end 126, the spool section 130, and the second piston end 128 are all a single, monolithic piece. The outer diameters of both piston ends 126 and 128 are the same size, so that equal pressures P1 and P4 acting on the outward facing surfaces 134, 136 of the piston ends 126, 128 result in canceled forces on the piston 110. The case of unequal diameters for bores 104, 108 is described above, in which case, the pressures P1 and P4 will not exactly balance, but the resulting force pressure imbalance can be balanced with a spring force or other motive force as needed.

The first sleeve 102 includes a first port 132 radially extending therethrough for fluid communication of a control fluid at pressure P1 to act on an outer face 134 of the first piston end 126 on an opposite side of the first piston end 126 from the spool section 130. The second sleeve 106 includes a second port 138 radially extending therethrough for fluid communication of a control fluid at pressure P4 to act on an outer face 136 of the second piston end 128 on an opposite side of the second piston end 128 from the spool section 130. Pressure differentials between pressure P1 and pressure P4 result in a force imbalance on the piston 110 for movement of the piston 110.

A face seal 124 is seated is in the seal carrier 112, sealing between seal carrier 112 and the second sleeve 106. Each piece 114, 116 (labeled in FIG. 3) of the seal carrier includes a circumferential groove 140 (labeled in FIG. 3) with a matching diameter among the pieces 114, 116. The face seal 124 is seated in the groove 140 of each piece 114, 116 as labeled in FIG. 3. The first sleeve 102 includes a third port 142 radially extending therethrough for fluid communication of a control fluid at pressure P2 into a volume 144 between the first and second piston ends 134, 136, sharing the volume 144 with the spool section 130. The second sleeve 106 includes a fourth port 146 radially extending therethrough for fluid communication of a control fluid therethrough at pressure P3.

Figure 2:
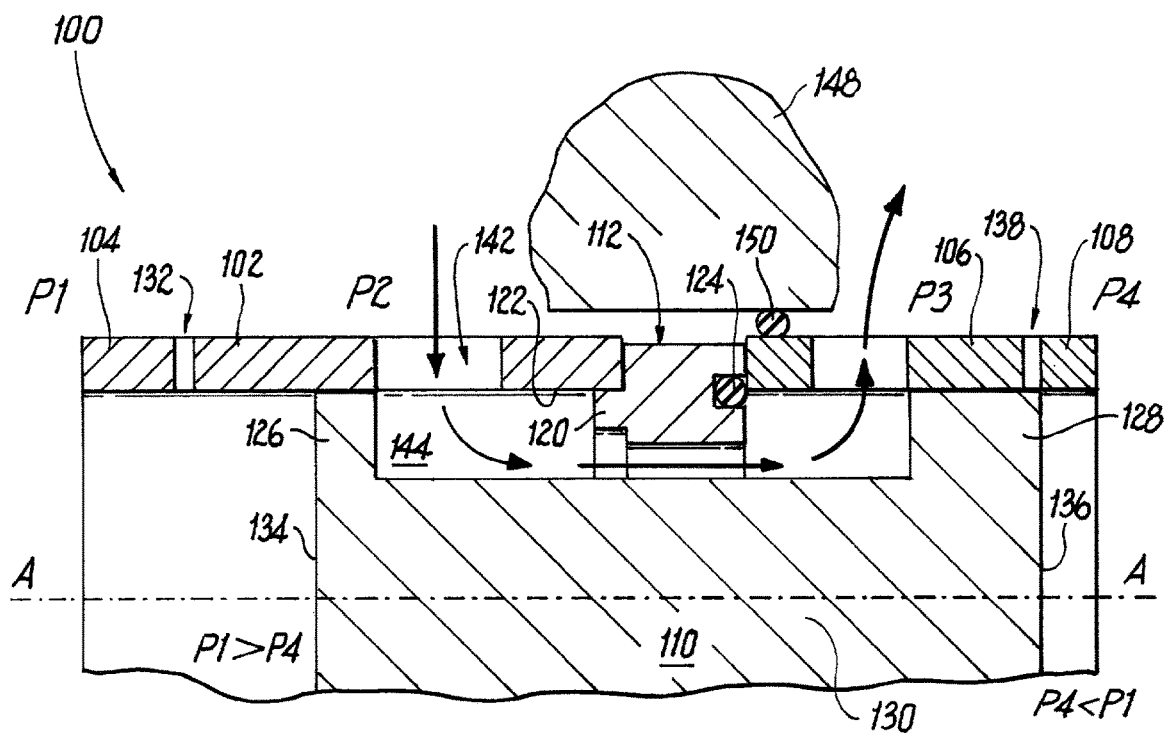
FIG. 2 is a schematic cross-sectional side view of the valve assembly of FIG. 1, showing the piston in a second position.

In a first position of the piston 110 shown in FIG. 1, the second piston end 128 seals against the face seal 124 preventing flow from the third port 142 to the fourth port 146. A housing 148 houses the first and second sleeves 102, 106 therein. A radial seal 150 around the second sleeve 106 seals against the second sleeve 106 and against the housing 148 to stop flow between circumferential gaps 118 (labeled in FIG. 3) between pieces 114, 116 (labeled in FIG. 3) of the seal carrier 112. The large, two-headed arrow in FIG. 1 indicates how the face seal 124 and the radial seal 150 block flow from passing from port 142 to port 146 when the piston 110 is in the first position. With reference to FIG. 2, in a second position of the piston 110, the second piston end 128 is spaced apart from the face seal 124 to allow fluid communication between the third port 142 and the fourth port 146. The large flow arrow in FIG. 2 indicates the flow of fluid from port 142 to port 146.

Figure 3:
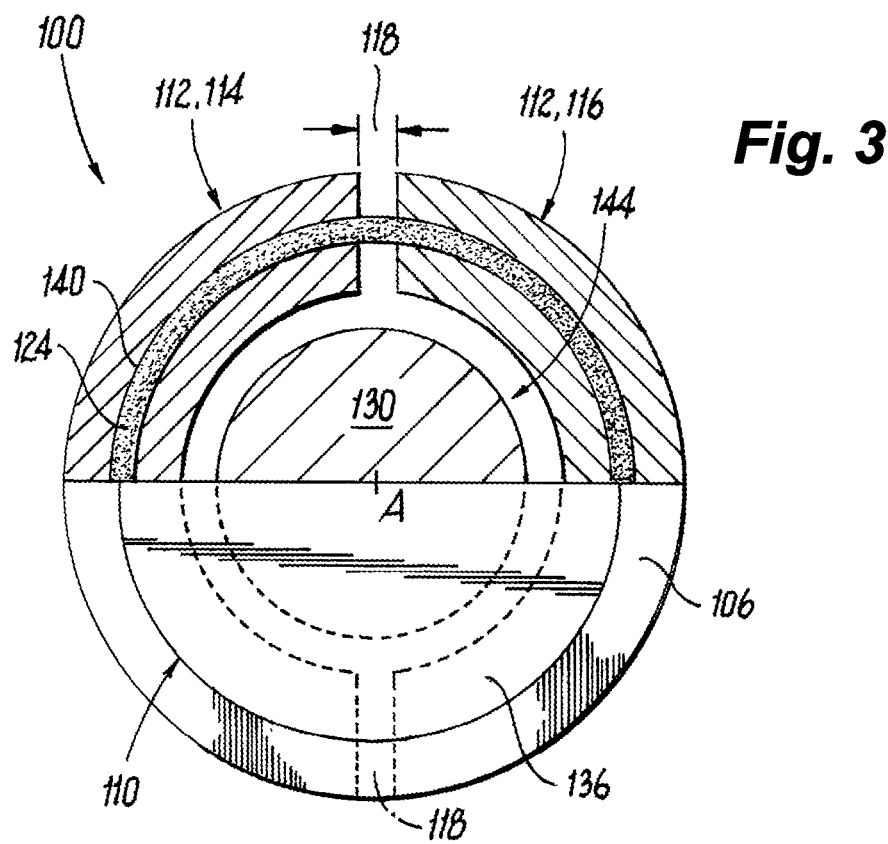
FIG. 3 is a schematic partial cross-sectional end view of the valve assembly of FIG. 1, showing the face seal and the gaps between the pieces of the multi-piece seal carrier.

As shown in FIG. 3, in the first position of the piston 110, the face seal seals around a full circumference of the second piston end 128 and of the second sleeve 106. The size of the gaps 118 can be designed so the face seal 124 never becomes overstuffed by inward compression of pieces 114, 116 into gaps 118.

Figure 4:
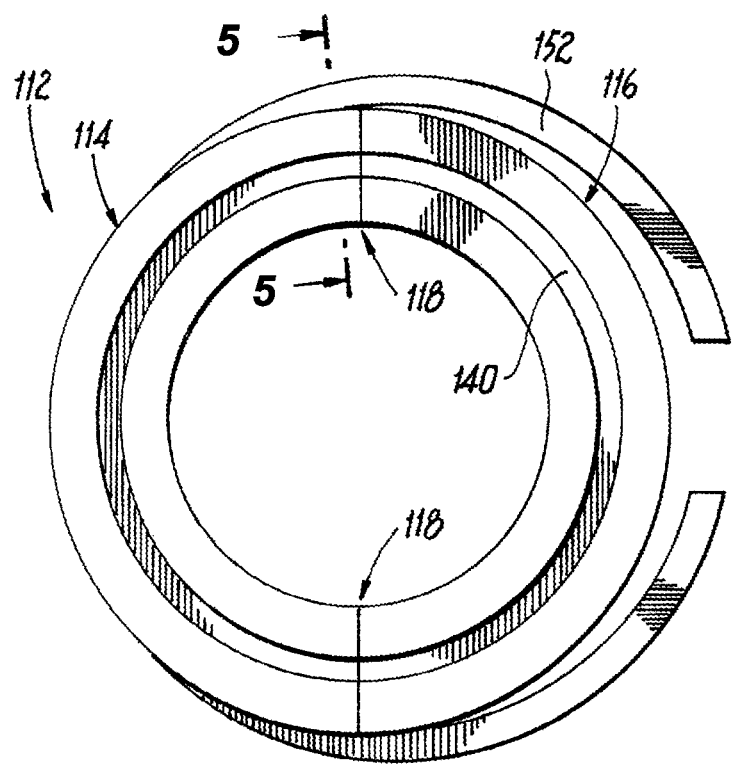
FIG. 4 is a schematic end view of the multi-piece seal carrier of FIG. 1, showing a snap ring retaining the pieces of the multi-piece seal carrier together.
Figure 5:
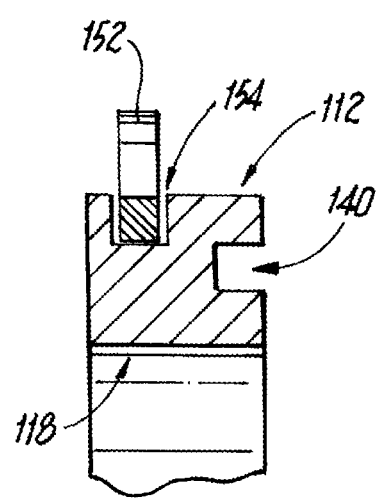
FIG. 5 is a schematic cross-sectional side view of the multi-piece seal carrier and snap rig of FIG. 4, showing the snap ring seat.

With reference now to FIGS. 4 and 5, a snap ring 152 can be engaged about the two pieces 114, 116 of the ring carrier 122 to hold the two pieces 114, 116 of the seal carrier 112 together. The snap ring 152 can be engaged into the grove 154 labeled in FIG. 5 after assembly of the pieces 114, 116 into the first sleeve 102 of FIG. 1.

Figure 6:
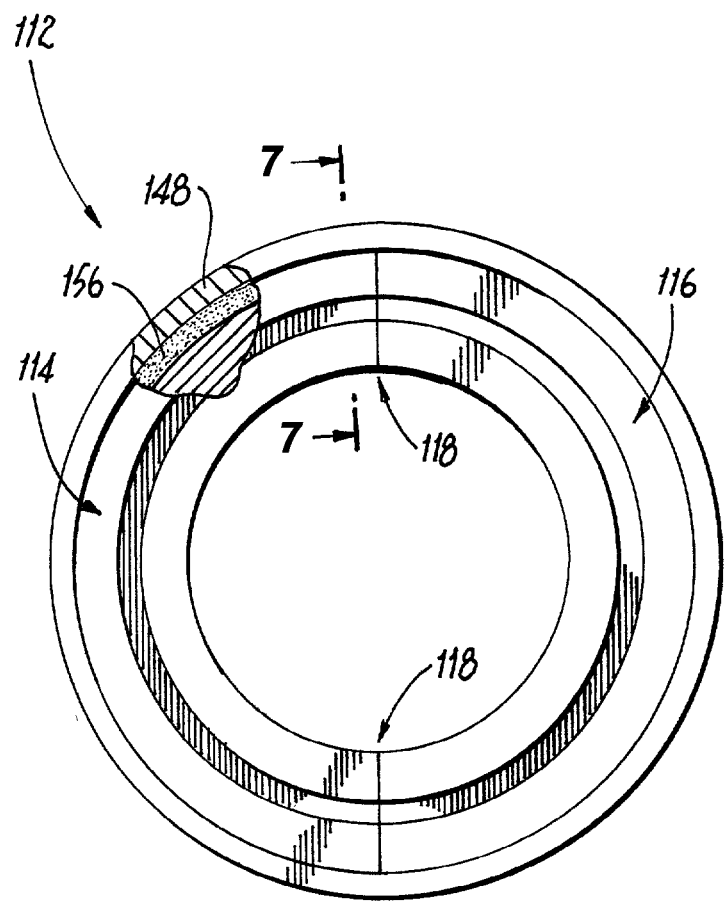
FIG. 6 is a schematic partial cross-sectional end view of the multi-piece seal carrier of FIG. 1, showing an o-ring retaining the pieces of the multi-piece seal carrier together.
Figure 7:
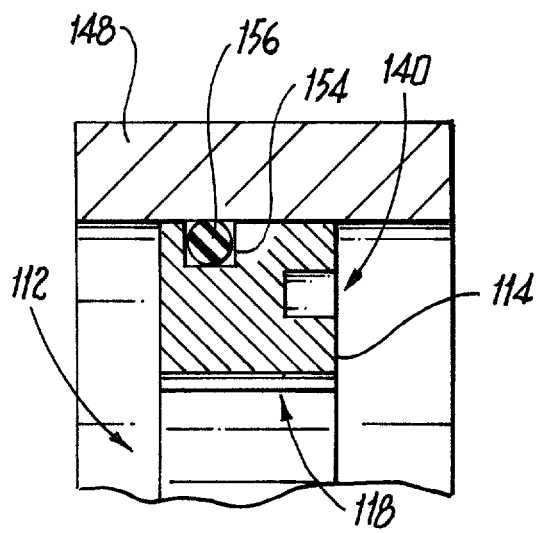
FIG. 7 is a schematic cross-sectional side view of the multi-piece seal carrier and snap rig of FIG. 4, showing the o-ring seat.

With reference to FIGS. 6 and 7, an o-ring 156 can be engaged about the two pieces 114, 116 to hold the two pieces 114, 116 of the seal carrier 112 together as shown in FIG. 6. The o-ring 156 can be assembled on the seal carrier in the groove 154 after assembly of the two pieces 114, 116 together, and the seal carrier 112 can then be fit to the bore of the housing 148 as shown in FIG. 7.

Figure 8:
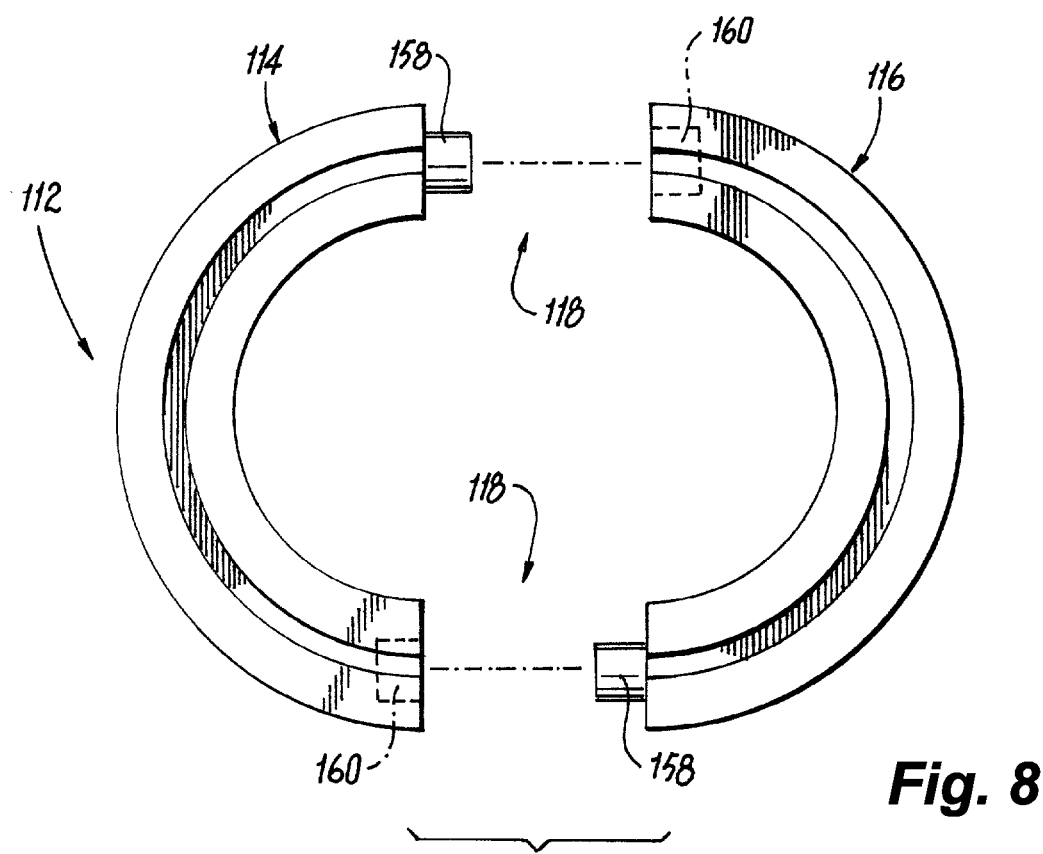
FIG. 8 is a schematic end view of the multi-piece seal carrier of FIG. 1, showing locating pins of the pieces of the multi-piece seal carrier together for alignment.

With reference now to FIG. 8, each piece 114, 116 of the seal carrier 112 can include a locating pin 158, which can be seated in a pin bore 160 of the other piece 114, 116. The pins 158 and bores 160 are in circumferential faces of the pieces 114, 116 and reduce the effects of assembly tolerances when the pieces 114, 116 are assembled together prior to seating in the housing 148 shown in FIG. 1.

Figure 9:
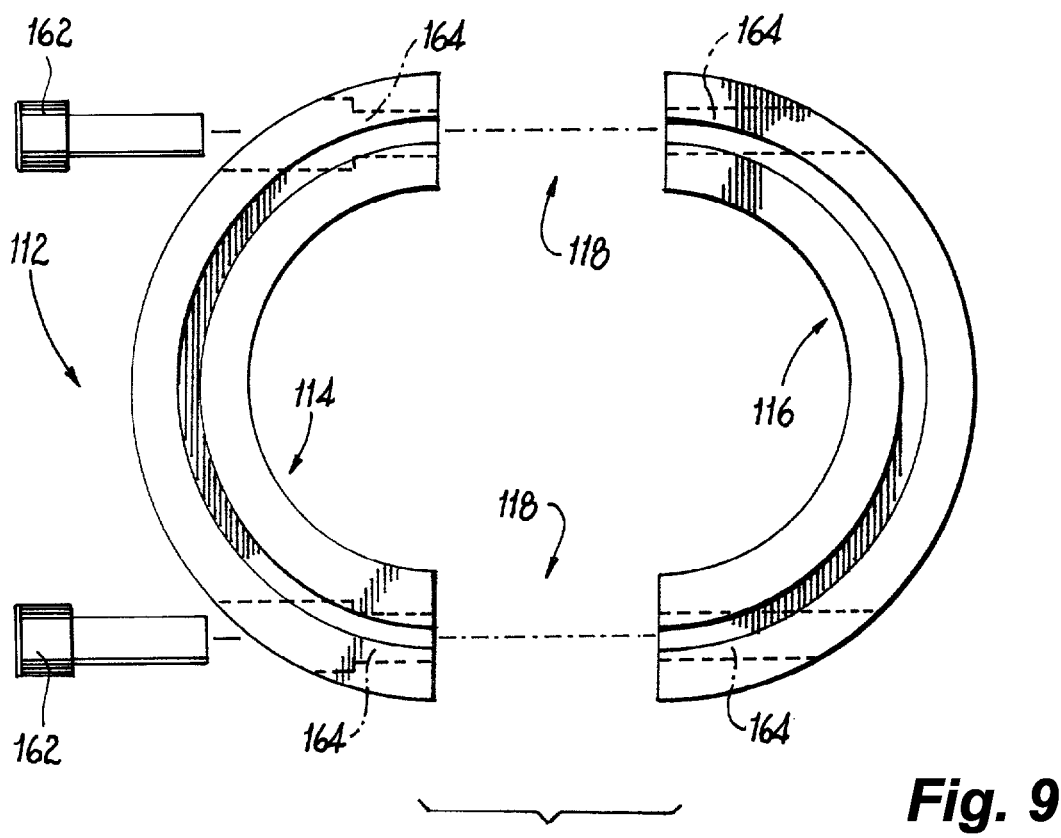
FIG. 9 is a schematic end view of the multi-piece seal carrier of FIG. 1, showing bolts for joining the pieces of the multi-piece seal carrier together.

With reference now to FIG. 9, the two pieces 114, 116 can be bolted together using bolts 162, e.g. threaded bolts, in the bores 164, e.g. threaded bores, across the gaps 118. This retains the pieces 114, 116 together during assembly into the housing 148 of FIG. 1, and reduces the effects of assembly tolerances.

Potential benefits of systems and methods as disclosed herein include the following. This split collar of the seal carrier 112 allows the use of a single piece spool, e.g. piston 110, rather than multi-piece spool. This can improve ease of assembly. This can also remove the need to structurally size an interface in the spool where there is less space, e.g. eliminates the need to assemble the piston ends and the spool section of the piston together with a fastener that can break.

The methods and systems of the present disclosure, as described above and shown in the drawings, provide for multi-piece seal carriers in valve assemblies, which allow for one-piece piston spools construction. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A valve assembly comprising:
   a first sleeve defining a piston bore therein;
   a second sleeve defining a piston bore therein, wherein the piston bore of the first sleeve and the piston bore of the second sleeve are axially aligned;
   a piston slidingly engaged in the piston bores of the first and second sleeves; and
   a seal carrier with a plurality of pieces, wherein the seal carrier is axially between the first sleeve and the second sleeve, wherein the plurality of pieces of the multi-piece seal carrier are circumferentially spaced apart from one another around one circumference.

2. The assembly as recited in claim 1, wherein the seal carrier extends circumferentially around the piston.

3. The assembly as recited in claim 1, wherein the seal carrier includes axially extending tabs that seat inside a radially inward surface of at least one of the first sleeve and the second sleeve.

4. The assembly as recited in claim 1, wherein the piston bore of the first sleeve has a diameter equal to that of the piston bore of the second sleeve.

5. The assembly as recite in claim 1, wherein the piston is spool shaped, with a first piston end engaged with the first sleeve, a second piston end engaged with the second sleeve, and a spool section connecting between the first and second piston ends, wherein the spool section has a smaller diameter that both of the first and second piston ends.

6. The assembly as recited in claim 5, wherein the first piston end, the spool section, and the second piston end are all a single, monolithic piece.

7. The assembly as recited in claim 1, wherein the first sleeve includes a first port radially extending therethrough for fluid communication of a control fluid to act on an outer face of the first piston end.

8. The assembly as recited in claim 7, wherein the second sleeve includes a second port radially extending therethrough for fluid communication of a control fluid to act on an outer face of the second piston end.

9. The assembly as recited in claim 8, further comprising a face seal seated in the seal carrier, sealing between seal carrier and second sleeve.

10. The assembly as recited in claim 9, wherein each piece of the seal carrier includes a groove with a matching diameter, wherein the face seal is seated in the groove of each piece.

11. The assembly as recited in claim 9, wherein the first sleeve includes a third port radially extending therethrough for fluid communication of a control fluid into a volume with the spool section between the first and second piston ends.

12. The assembly as recited in claim 11, wherein the second sleeve includes a fourth port radially extending therethrough for fluid communication of a control fluid therethrough, wherein in a first position of the piston, the second piston end seals against the face seal preventing flow from the third port to the fourth port, and wherein in a second position of the piston, the second piston end is spaced apart from the face seal to allow fluid communication between the third port and the fourth port.

13. The assembly as recited in claim 12, wherein in the first position of the piston, the face seal seals around a full circumference of the second piston end and of the second sleeve.

14. The assembly as recited in claim 9, further comprising a housing that houses the first and second sleeves therein.

15. The assembly as recited in claim 14, further comprising a radial seal around the second sleeve sealing against the second sleeve and against the housing to stop flow between circumferential gaps between pieces of the seal carrier.

16. The seal assembly as recited in claim 1, wherein there are two pieces of the seal carrier, wherein two circumferential gaps space apart the two pieces from one another.

17. The seal assembly as recited in claim 16, further comprising a snap ring engaged about the two pieces to hold the two pieces of the seal carrier together.

18. The seal assembly as recited in claim 16, further comprising an o-ring engaged about the two pieces to hold the two pieces of the seal carrier together.

19. The seal assembly as recited in claim 16, wherein each piece includes a locating pin seated in a pin bore of the other piece.

20. The seal assembly as recited in claim 16, wherein the two pieces are bolted together across the gaps.

* * * * *